United States Patent [19]

Frazer et al.

[11] 3,992,110

[45] Nov. 16, 1976

[54] MULTI-SPECTRAL OPTICAL COMPARATOR

[75] Inventors: Richard A. Frazer, King George; William J. Taczak, Jr., Fredericksburg, both of Va.

[73] Assignee: The United States of America as represented by the Secretary of the Navy, Washington, D.C.

[22] Filed: Sept. 3, 1974

[21] Appl. No.: 503,016

[52] U.S. Cl. ............................... 356/189; 250/227
[51] Int. Cl.² ......................................... G01J 3/48
[58] Field of Search ................. 356/186, 189, 83; 250/227, 339; 350/96 C

[56] References Cited
UNITED STATES PATENTS

| | | | |
|---|---|---|---|
| 2,597,001 | 5/1952 | Jaffe | 356/83 |
| 2,981,826 | 4/1961 | Mattern | 350/96 C |
| 3,119,086 | 1/1964 | Dreyfus | 250/227 |
| 3,448,276 | 6/1969 | Witte | 250/227 |
| 3,707,030 | 12/1972 | Hunter et al. | 356/186 |
| 3,761,184 | 9/1973 | McLaughlin, Jr. | 356/186 |
| 3,762,546 | 10/1973 | Keitel et al. | 356/186 |
| 3,825,754 | 7/1974 | Cinzori et al. | 250/339 |

*Primary Examiner*—Vincent P. McGraw

[57] ABSTRACT

An optical sensor has a collecting lens, filters and detectors. The collecting lens is fabricated from a single piece of optical material and has a truncated conical surface, an input surface adjacent the wide end of the truncated conical surface and an output surface adjacent the narrow end of the truncated conical surface. A plurality of detectors is positioned proximate the output surface and a filter, which allows the passage only of radiation of a predetermined band of wave lengths is positioned between each of the detectors and the output surface. When radiation is incident on the input surface, it is passed through the filters to the detectors. The resultant detected optical signals are translated into electrical signals which are compared to discriminate between a radiating source or sources having the desired spectral characteristics and a source or sources having undesired spectral characteristics. The result of the comparison is an output signal indicative of the presence of the desired radiation. This signal is then applied to a utilization circuit which may include an alarm, a recorder or a fire-control system.

8 Claims, 2 Drawing Figures

MULTI-SPECTRAL OPTICAL COMPARATOR

BACKGROUND OF THE INVENTION

This invention relates to optical detection systems using a plurality of sensors, each of which is sensitive to radiation in a different band of the optical spectrum.

Optical detection systems which must scan large unknown areas at rapid rates of speed or which must scan remote electromagnetic radiation sources in general have difficulty in discriminating between radiation emitted by the object it is desired to locate and incidental, or ambient radiation. One such system is carried on-board aircraft or sea-going vessels to detect the flash of firing anti-aircraft guns, missiles or fuzes. As the detectors of this system scan the ground or sea, ambient light is often reflected and the detectors will give false positive readings. Another such system with similar difficulties is one used to remotely sense temperature. In this system solar radiation may cause erroneous measurements. The reason for this difficulty and one method of overcoming it will become more understandable on an examination of some fundamentals of electro-optics.

The optical spectrum includes electromagnetic radiation which varies from UV radiation, through the visible spectrum, to IR radiation. The radiation of the optical spectrum has wave lengths which vary from less than 0.35 micrometers to greater than 14 micrometers.

A radiating source of electromagnetic energy, such as a gun flash, does not radiate at a single wave length, but rather emits at a series of wave lengths of varying intensities, which is called its optical "signature." Thus, a radiating source such as a gun flash may have an optical signature which is different from that of other sources.

One means of discriminating between spurious radiation and the radiation it is desired to detect is to use two detectors, each of which detects the radiation in a different, narrow band of the spectrum. By careful selection of the bands of radiation detected, the outputs of the detectors may be compared against known outputs to determine whether the radiation detected has the signature of the radiation it is desired to detect.

The major difficulties with this two detector system are its directionality and its complicated, lens type construction. When flashes of light impinge on the detectors at angles which deviate from an axis perpendicular to the plane of the two detectors, one of the two detectors may fail to detect this flash. The result will be inaccurate data obtained from the detector system. In addition, the complicated lens-type arrangement increases the risk that components of the system will be injured when subjected to shock or will become misaligned during normal use. The present invention has been made in order to eliminate these difficulties.

SUMMARY OF THE INVENTION

Briefly, the invention for the detection of flashes of light and other electromagnetic radiation comprises a collecting lens, a plurality of detectors and a filter for each detector. The collecting lens is fabricated from a single piece of optical material, such as silicon, germanium or glass and has a truncated conical surface, which is reflectively coated, an optical input surface adjacent the wide end of the truncated conical surface and a flat output surface adjacent the narrow end of the truncated conical surface. The detectors are equal-area optical detectors, and the filters, one of which is positioned between each detector and the output surface of the lens, are sensitive to different regions of the optical spectrum. One of the filters may allow the passage of radiation from the region of the spectrum which is the principal wavelength or of greatest intensity emitted by ambient or spurious flashes of light. Additional filters may be added which are sensitive to other regions of the electromagnetic spectrum which are of interest.

When a light flash or other electromagnetic radiation is incident on the collecting lens, it is gathered by the wider optical input surface, and travels through the optical material of the collecting lens. The light beam or other electromagnetic radiation passes through the lens' focal plane, defocuses, strikes the reflective coating and is reflected toward the detectors, at the output surface of the lens. The radiation which is reflected is thus "scrambled," that is, randomly representative of the wave length of the radiation and has a nearly uniform flux density distribution at the output surface. When the defocused, reflected radiation reaches the output surface it passes through one of the filters, and then is detected. The outputs of the detectors are then compared to determine whether the incident radiation is composed of radiation with wave lengths in the region of the spectrum of interest. THe detection apparatus thus provided is a simple, sturdy, solid assembly which is not subject to misalignment.

STATEMENT OF THE OBJECTS OF INVENTION

An object of the invention is to detect optical radiation and discriminate between radiation from different predetermined regions of the electromagnetic spectrum by means of a solid assembly which is sturdy and shock resistant.

Another object of the invention is to detect optical radiation and discriminate between radiation from different predetermined regions of the optical spectrum by means of a solid assembly which does not require alignment and is not susceptible to misalignment.

DETAILED DESCRIPTION OF THE PREFERRED EMBODIMENT

Figure 1:
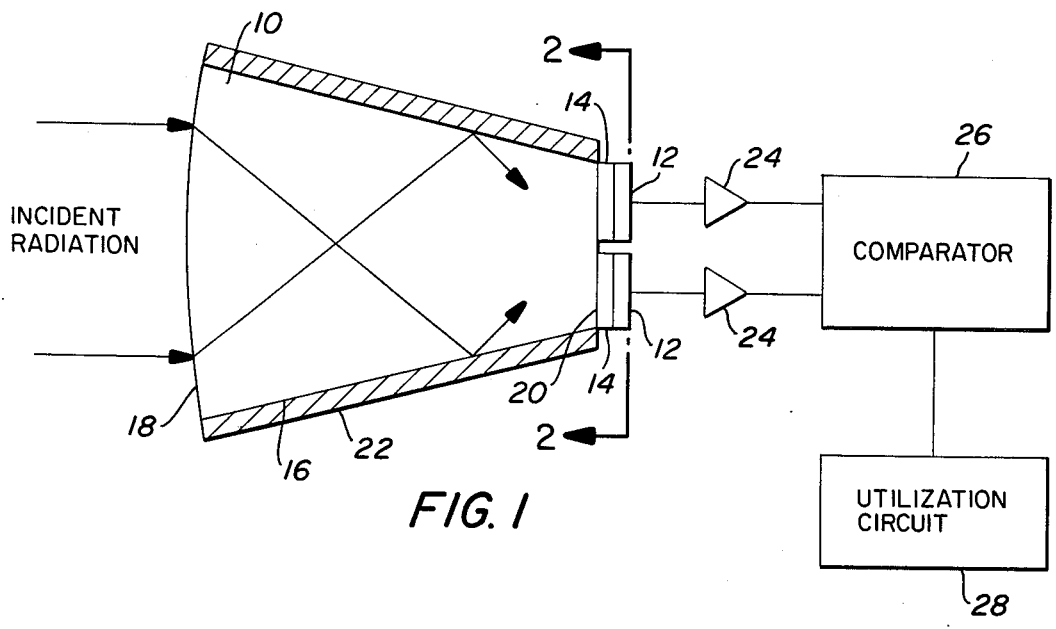
FIG. 1 is a schematic diagram of the construction of the collecting lens, filters and detectors of the invention and of the associated electronic circuitry.

The multi-spectral optical sensor, as seen in FIG. 1, has a collecting lens 10, a plurality of optical detectors 12, and a plurality of filters 14. Collecting lens 10 is fabricated from a single piece of optical material, such as silicon, germanium or glass. The lens has three surfaces; a truncated conical surface 16, an optical input surface 18 and a flat optical output surface 20. The truncated conical surface is symmetrical about the central axis of the lens, and forms a truncated right circular conical surface and may be made by a number of simple manufacturing processes, such as molding or machining. The outer surface of the collecting lens 10 at surface 16 is coated or covered with an optically reflective coating such as a silver coating.

Optical input surface 18 bounds and is adjacent the wider end of conical surface 16. Input surface 18 may be any shape, but preferably is convexly curved, as shown in FIG. 1, in order to collect as much light as possible into lens 10. Optical output surface 20 bounds and is adjacent the narrow end of truncated conical surface 16. Output surface 20 is preferably normal to the central axis of the conical surface and is flat so that detectors 12 and filters 14 may be readily and sturdily fixed to lens 10, making the sensor mechanically stable.

Since collecting lens 10 is fabricated from a single piece of optical material and collects radiation along the entire input surface 18, no complicated lens system is required which must be focused to collect radiation for two or more detectors. When the radiation emitted by a source is incident on the input surface 18 the radiation is collected into lens 10 and is focused at the lens's focal plane, and then defocuses, after passing through the focal plane. The radiation next strikes the reflective coating 22 on the truncated conical surface 16, and is reflected either down the lens to another point on the reflecting surface or onto the optical output surface 20. Eventually, all the radiation which is collected at the input surface 18 is reflected onto the output surface 20. The effect of defocusing and reflecting the incident radiation is to produce a "scrambling" effect so that the radiation will be of nearly equal flux density distribution at the output surface. Thus it is impossible to misalign collecting lens 10, after its initial construction since any radiation which is incident on input surface 18 is collected by lens 10 and is applied at output surface 20.

Figure 2:
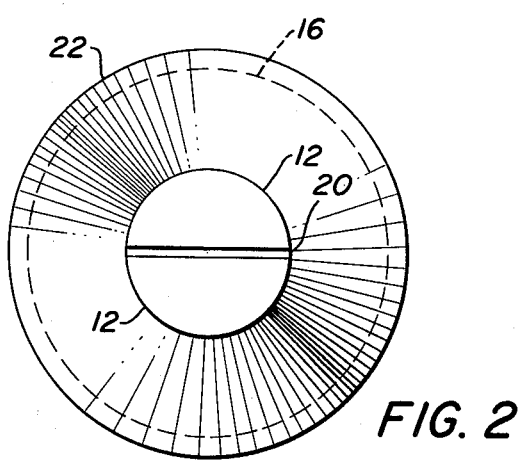
FIG. 2 is a cross-sectional view along line 2—2 of FIG. 1, illustrating in particular the configuration of the detectors of the invention.

Optical detectors 12, shown in greater detail in FIG. 2, are positioned proximate the output surface in order to receive the radiation which is incident on output surface 20. The optical detectors are known detectors which are available commercially. In FIG. 2, detectors are seen covering most of the area of output surface 20 in a semi-circular array. The detectors 12 are of equal areas and are symmetrically arranged around a diameter of output surface 20. A small gap is left between the two detectors so that an independent electrical output signal may be obtained from each detector.

The configuration of the detectors shown in FIG. 2 has been chosen to provide an optimum output signal from the incident radiation. This configuration is one of many which may be employed. For example, circular, square, rectangular and pie-shaped detectors may be used. Additionally, any number of detectors may be employed, enabling discrimination between a greater number of optical signals from varying spectral bands.

Returning to FIG. 1, filters 14 are shown, one of which is positioned between each optical detector 12 and the output surface 20. The reflected, scrambled radiation which is incident on output surface 20 is next passed through filters 14. Each filter is sensitive to the electromagnetic radiation from a different spectral band, depending on the optical "signature" of the radiation source it is desired to eliminate or correct. For example, to detect the radiation from a source characterized as a black body radiating from 800° K to 1,300° K and to prevent false signals due to solar radiation, two spectral filters 14 will be used, one designed to transmit radiation in the spectral band from 1.8 to 2.1 micrometers and the other designed to transmit radiation in the spectral band from 2.2 to 2.5 micrometers. If the incident radiant energy is solar radiation, it can be shown from Planck's black body equations that there will be more radiation in the 1.8 to 2.1 micrometer region than in the 2.2 to 2.5 micrometer region. If, however, the incident radiant energy is from a black body source radiating between 800° K and 1,300° K, there will be more radiation in the 2.2 to 2.5 micrometers band region than in the 1.8 to 2.1 micrometer band region. Detectors 12 will thus receive output signals whose relative levels are indicative of the source of the incident radiation. The signals from detectors 12 are amplified by preamps 24 and compared by a simple comparator 26, which will then send an output signal when the difference in output signals of the detectors 12 indicate the presence of incident radiation emanating from a black body source radiating between 800° K and 1,300° K. The output signal from the comparator 26 is applied to a utilization circuit 28 which may be an alarm, meter, fire control system or the like. While radiation of a black body radiating from 800° K to 1,300° K was discriminated from solar radiation in the example described above, any optical radiation source may be discriminated from any ambient or spurious source, by use of the proper filters.

Thus, a simple, sturdy multi-spectral optical sensor has been provided which need not be aligned after its initial construction to detect radiation from a specific source and to discriminate against ambient or spurious radiation.

What is claimed is:

1. A multi-spectral optical sensor for detecting the electromagnetic energy radiated in a plurality of spectral bands by a random event source, such as a gun flash, comprising:
   a collecting lens fabricated from a single piece of optical material, said lens having a truncated conical surface, an optical input surface adjacent the wide end of the truncated conical surface, and an output surface adjacent the narrow end of the truncated conical surface;
   at least two optical detectors positioned proximate the output surface;
   at least two optical filters, one positioned between each detector and the output surface of the lens, and each filter allowing the passage of electromagnetic radiation from a different region of the optical spectrum; and,
   means electrically connected to said detector for comparing the detected radiation to the optical signature of a known source.

2. The optical sensor of claim 1 wherein the truncated conical surface has the configuration of a truncated right circular cone.

3. The optical sensor of claim 2 wherein the truncated conical surface is coated with a silver layer.

4. The optical sensor of claim 3 wherein the output surface is flat and normal to the central axis of the truncated conical surface.

5. The optical sensor of claim 4 wherein the input surface is convexly curved.

6. The optical sensor of claim 5 wherein the detectors are symmetrically disposed about a diameter of the output surface.

7. The sensor of claim 6 wherein the lens is fabricated from a material selected from the group consisting of silicon, gemanium and glass.

8. The sensor of claim 1, including means electrically connected to said comparing means for indicating the optical signature of the detected radiation.

* * * * *